US007658323B2

(12) United States Patent
Kleinman et al.

(10) Patent No.: US 7,658,323 B2
(45) Date of Patent: Feb. 9, 2010

(54) POINT-OF-SERVICE (POS) AND POS APPLICATION COMPATABILITY

(75) Inventors: Ronald J. Kleinman, Santa Clara, CA (US); Robert V. Ganley, Jr., Andover, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 591 days.

(21) Appl. No.: 11/439,748

(22) Filed: May 24, 2006

(65) Prior Publication Data

US 2007/0276763 A1 Nov. 29, 2007

(51) Int. Cl.
*G06K 5/00* (2006.01)
(52) U.S. Cl. ........................... 235/380; 235/375
(58) Field of Classification Search ............... 235/380, 235/375, 379; 705/7
See application file for complete search history.

(56) References Cited

U.S. PATENT DOCUMENTS

| 2004/0107125 A1* | 6/2004 | Guheen et al. ............. 705/7 |
| 2005/0261969 A1* | 11/2005 | Dimmock et al. ............ 705/16 |
| 2005/0273391 A1* | 12/2005 | Armentrout et al. .......... 705/16 |
| 2007/0050751 A1* | 3/2007 | Husmann et al. ............ 717/105 |
| 2007/0055574 A1* | 3/2007 | Jensen et al. ............... 705/24 |

OTHER PUBLICATIONS

Point-Of-Sale (POS) applications increase accuracy and reduce costs, Java Technology Offers a Refreshing POS Alternative, URL: sun.com/solutions/documents/articles/RE_pos_refresh_AA.xml, May 2004, pp. 1-3.
The POS that Refreshes, http://www.sun.com/br/retail_1009/feature_pos.html, 2003, pp. 1-3.
A retailer's guide to JavaPOS Solutions, Retail Council of Canada, 2003, pp. 1-14.
Java for Retail POS, Programming Guide, version 1.6, Sun Microsystems, Inc., Jul. 15, 2001, pp. i-viii, 1-67.

* cited by examiner

*Primary Examiner*—Edwyn Labaze
(74) *Attorney, Agent, or Firm*—Marsh Fischmann & Breyfogle LLP; Kent A. Lembke

(57) ABSTRACT

A system for using compatible point-of-service (POS) applications to access and control devices of a POS unit. A server runs a POS application and a set of peripheral drivers (or device controls). A networked POS unit communicates with the host server via a communication network, and the networked POS unit includes peripherals connected locally to its I/O ports. The POS unit further includes a device communications management module processing output received from the host server that is generated by the POS application and is targeted at one of the connected peripheral ports. The device communications management module transfers POS device input from the peripherals over the communication network to the host server for processing by the POS application. The POS application interfaces with the peripheral drivers, and the output is provided by one of the peripheral drivers that corresponds to the target peripheral of the networked POS unit.

16 Claims, 3 Drawing Sheets

POINT-OF-SERVICE (POS) AND POS APPLICATION COMPATABILITY

BACKGROUND OF THE INVENTION

1. Field of the Invention

The present invention relates, in general, to remote and/or networked point-of-service (POS) terminals and handheld units (herein referred to as "POS") containing collections of devices such as those used in retail, distribution, and the like, and, more particularly, to software, hardware, systems, and methods for operating remote and/or networked POS in a networked manner such that the devices are compatible with each other and with desktop devices within the network.

2. Relevant Background.

In many industries, there has been significant growth in the use of handheld, mobile computing units that communicate wirelessly with a computer network or system. These units are used in a variety of ways including tracking inventory, issuing traffic and parking tickets, processing patient information at a hospital, and processing customer and product information in retail environments. For example, the retail industry uses such networked remote units for customer interaction, such as kiosks or mobile hand held POS. Each of these units typically is configured with hardware and software to allow it to communicate with a central or host server and to control or operate a number of devices. For example, a networked retail POS unit may have attached devices that it controls such as a magnetic strip reader (e.g., credit card reader), a touch screen, a keyboard or keypad, a mouse, a bar code scanner, and a printer (e.g., a receipt printer). In the retail setting, these devices provided as part of a POS are used to efficiently and reliably process sales or service transactions at or near a checkout counter or aisle and also are often used to perform a number of other key retail functions including managing inventory, tracking sales, understanding customer buying patterns, delivering customer loyalty programs, supporting coupon and store card redemption, and other activities to increase customer service levels and sales associate productivity.

With the increase in the number and variety of POS and their attached POS devices, a growing concern is how to cost effectively maintain and manage POS within the overall distributed network. Presently, remotely accessing networked devices requires that applications be specifically modified to support such network access and specific network-aware drivers for each of the attached devices be installed on the remote or mobile POS (or POS unit). As a result, it has been difficult to manage a combined network of standalone, networked and remote POS units since even the same device (such as a scanner or the like) often requires software that is incompatible or at least different depending on whether it is accessed remotely even within the same store or business. Maintenance is made difficult because each POS unit must have its own code written and installed to run, for example, a custom POS package along with the device-resident drivers for the particular peripherals attached to the POS unit. This causes multiple problems including a proliferation of software packages to be maintained by a company's information technology (IT) personnel and also, numerous interfaces to learn by the IT personnel and users of the POS units. Also, the dynamic nature of retail and other industries requires successful businesses to be able to react quickly and adopt new POS devices (such as a smart card reader or the like) and customer service software. This leads to more and more upgrading and changes of the POS unit and its devices and included software, which can be time consuming and costly. As a result, there is an ongoing demand for more compatible and easier to maintain and use remote or mobile POS units for in-store or business networks.

To address the need for standardization in the retail industry, the Association of Retail Standards (ARTS) has developed and administers further development of the UnifiedPOS standard for retail POS devices. The UnifiedPOS provides an architectural definition for each type of POS device in terms of a unique set of properties, methods, and events, e.g., UML APIs defining such properties, methods, and events, so that any POS application that complies with the UnifiedPOS standard can potentially execute independently of the set of peripherals or POS devices connected to the POS (i.e., the terminal or unit containing the POS devices) upon which the POS software or application is deployed or run. In other words, the UnifiedPOS standard defines a model for how devices such as scanners and printers interface with the POS and the POS application software, which potentially allows retail stores to employ peripherals from numerous manufacturers without affecting their POS application. As such the UnifiedPOS standard is a guide for how applications should be written to interact with POS peripherals and the POS system, but for its full value to be realized, UnifiedPOS must be mapped to a specific deployment platform. Currently, there are two such platform mappings: JavaPOS and OPOS, with the JavaPOS being based on the Java programming language and OPOS using the Windows operating system platform. When deployed, JavaPOS applications run on all operating systems including Windows, Linux, and UNIX, while OPOS applications run only on the Windows operating system, but JavaPOS and OPOS applications both comply with UnifiedPOS and provide an improved level of interoperability to allow nearly any local peripheral or POS device to be accessed and controlled by a POS application.

UnifiedPOS in the retail market has seen significant success as evidenced by the number of independent software vendors who have developed applications that are in conformation with UnifiedPOS. The number of customers deploying applications which use UnifiedPOS has grown year over year. This large installed base of customers and applications that are compliant with UnifiedPOS is evidence of the benefits of the standardized device interface abstraction approach to device access by software applications. Similar standardized approaches could be developed for markets other than retail.

Even with the adoption of POS applications complying with UnifiedPOS, the IT infrastructure for existing POS systems can be complex and hinder maintenance and upgrades. A typical POS system includes in-store servers that are installed to handle functions such as managing, recording, and storing transaction data and communicating such data to systems outside the store. The POS units or terminals are typically "fat" in that they contain the entire POS stack. For example, a typical POS system 100 that includes a POS terminal or client POS (or POS unit or terminal) 120 that is configured using JavaPOS is shown in FIG. 1. As shown, a host server 110 is provided that runs a variety of host retail applications 114, such as for tracking and processing data collected by the POS 120. The POS 120 communicates in a wired or wireless fashion with the host server 110 to provide data, such as sales data, to the host POS applications 114. The POS 120 is "fat" because it is basically a standalone computer or computing device that includes a processor 122, an operating system (OS) 124, memory 128, and the entire POS stack. The POS stack includes in this JavaPOS embodiment (with a similar stack provided for OPOS embodiments) a JavaPOS application 130, JavaPOS device controls 132, Java- POS device services 134, and a javax.comm module 136 that provides the communication interface with a set of locally connected peripherals or POS devices 138. The JavaPOS device controls 132 and JavaPOS device services 134 are used to map the JavaPOS application 130 to the POS devices 138 and are the drivers for the POS devices 138. As can be seen, the POS footprint on the POS 120 is relatively large requiring processing power and other hardware to support the POS stack and application. Additionally, upgrading the POS 120 requires the POS 120 to be reconfigured such as by replacing the JavaPOS application 130 or drivers/services 132, 134, and such maintenance must be performed on each such POS 120.

Some attempts have been made to simplify POS or to make these units or terminals "thinner" to reduce the complexity and cost of each POS and to reduce maintenance and coding issues. For example, ARTS is developing a WamPOS architecture in which a POS application is run on a web server rather than on the local POS terminal. While this architecture separates the devices from the POS application, the POS terminal remains relatively "fat" as it runs a web browser and the complete HTML protocol stack that is used to communicate with the POS application using a device specific markup language and web communication technology (e.g., JavaScript and HTTP). A further drawback of this approach is that the JavaScript alters with each browser variant and the markup language used by the web server requires separate definitions for each POS device or peripheral, and additionally, the POS terminal must be configured with special link code to allow the browser to communicate with the POS stack on the POS terminal, i.e., for the browser to interface with the local device service code. The POS terminal typically also includes a virtual machine and an operating system that considerably increase the footprint on the POS terminal. This approach is also undesirable because it provides a completely different POS application interface than is found in existing POS terminals and system, e.g., different than provided in the system 100 of FIG. 1. This means that under WamPOS and similar approaches that any existing POS application and device service modules have to be rewritten.

While significant steps have been made in the area of remote or mobile POS, there continues to be a need for improved methods of operating and configuring their attached devices such that the applications controlling them are compatible with each other and with existing POS applications running on checkout-lane POS controlling locally connected peripherals or POS devices. This goal is to allow the same POS applications to service any POS and allow the remote or mobile POS and attached POS devices to be more easily be maintained and upgraded with new controlling applications and retail peripheral device servers without requiring corresponding changes to the POS applications.

SUMMARY OF THE INVENTION

The present invention addresses the above problems by providing a method (and corresponding software and hardware components) for operating networked POS units or terminals (or simply "POS") with multiple peripherals and/or POS devices in a consistent manner. This is achieved in part by treating the networked POS as remote device clusters whose sole function is to run a device communications management module that services direct reads from and writes to the I/O ports to which its peripherals (in some embodiments, POS devices) are attached in response to commands from a POS application on a host server. The host server is typically adapted, such as with Sun Ray Server javax.comm software or the like, to access and manage the networked POS terminal's devices exactly as if they were local. Significantly, the host server can then run instances of a POS or other application along with all associated device controls and device services. During operation, the host server performs all of the logic processing for the networked POS client system including driving the peripherals or devices attached to the networked client based on commands from the POS or other application. In this manner, the networked POS is much "thinner" than prior networked POS since the device communications management module that maps server I/O commands to the local I/O ports can be implemented on the "bare metal" without including an operating system or any device-specific drivers. Upgrades or maintenance to the POS or other application and device drivers only has to be performed once on the server and will be immediately reflected in all the networked or client POS supported by the server.

More particularly, a networked device system is provided for supporting compatible or consistent point-of-sale or service (POS) applications, whether the POS applications are accessing and controlling local or remote client devices (e.g., POS devices on a POS or a POS unit). The system includes a host server running a POS application and a set of peripheral drivers (e.g., UnifiedPOS-compliant device services). A communication network is provided for transferring digital data to and from remote, networked units or terminals such as POS. The system further includes a networked client terminal, such as a POS unit, that communicates with the host server via the communication network (i.e., through wired or wireless connectivity between the POS unit and the network). The networked client POS unit includes a plurality of connected retail devices (i.e., POS devices) such as a display, a keyboard or key pad or touch screen display, a printer, a card swipe device, a scanner, and the like that are connected to serial or other communication ports of the POS unit. The networked client POS unit further includes a device communications management module that processes output received over the network from the host server (i.e., that is typically generated by the POS application) that is targeted at one of the connected I/O ports of the networked client POS unit. The device communications management module also functions to transfer POS device input from one or more of the I/O ports over the communication network to the host server, i.e., to the POS application for processing. In other words, the device communications management module receives and passes on reads from or writes to its local I/O ports as directed by the POS application (through the appropriate device service or driver) running on the host server.

The POS application interfaces with the set of device drivers (e.g., POS device drivers such as UnifiedPOS device services). More specifically, the set of drivers includes all those needed to support each peripheral or POS device expected to be attached to the networked client POS unit. The connected peripherals are typically attached or connected to ports of the POS unit, and the host server may include a discovery module or configuration module for mapping each of the peripherals or POS devices to one of the ports and further include a module for supporting communication of the output to the port mapped to the target peripheral or POS device (e.g., the host server may include javax.comm or a similar communication component). In some embodiments, the host server includes a thin client server module (e.g., Sun Ray Server Software or the like) that uses a simple on-the-wire protocol to emulate directly connected retail peripherals, which are in reality located on a remote or mobile POS unit or terminal. Communications of the POS device input and output to specific POS unit device ports are accomplished via this communication protocol and implemented by the thin client server module and the device communications management module (or another component in the networked client device).

According to another aspect of the invention, a method is provided to run POS applications with input from and output to POS devices connected to or provided as part of a networked terminal or POS. The method includes providing a server that is linked to a digital communication network. The server is operated to determine a set of client units (e.g., client POS) communicating on the network, and this includes determining a set of peripherals associated with each of the client devices. Typically, but not always, a static "config" file (e.g., an XML file or the like) is utilized by the server, and in JavaPOS-based implementations, this determining step may include submitting the static configuration file to a Java Configuration Loader (JCL) to allow appropriate drivers to be loaded at runtime as the peripherals or POS devices are accessed by a POS or other application running on the server. In some embodiments of the method, the configuration file defines the I/O port each peripheral or POS device is connected to on each remote or mobile unit or POS (and, in some cases, there may be multiple configuration files with one being provided for each unit or POS that the server controls).

The method continues with running an instance of a POS application on the server for each of the client units or POS. A device control is called on the server with one of the POS applications to drive an output of the POS application to one of the I/O ports associated with the peripheral or POS device of one of the client POS units. In some preferred embodiments, the POS applications and the device control are written to comply with the UnifiedPOS standard, such as by compliance with JavaPOS or OPOS. The method further includes running a device communications management module on the client POS units to process output from the POS application and direct this output to the appropriate or addressed I/O port for a particular peripheral or POS device (e.g., address to a particular POS device port).

DETAILED DESCRIPTION OF THE PREFERRED EMBODIMENTS

Figure 1:
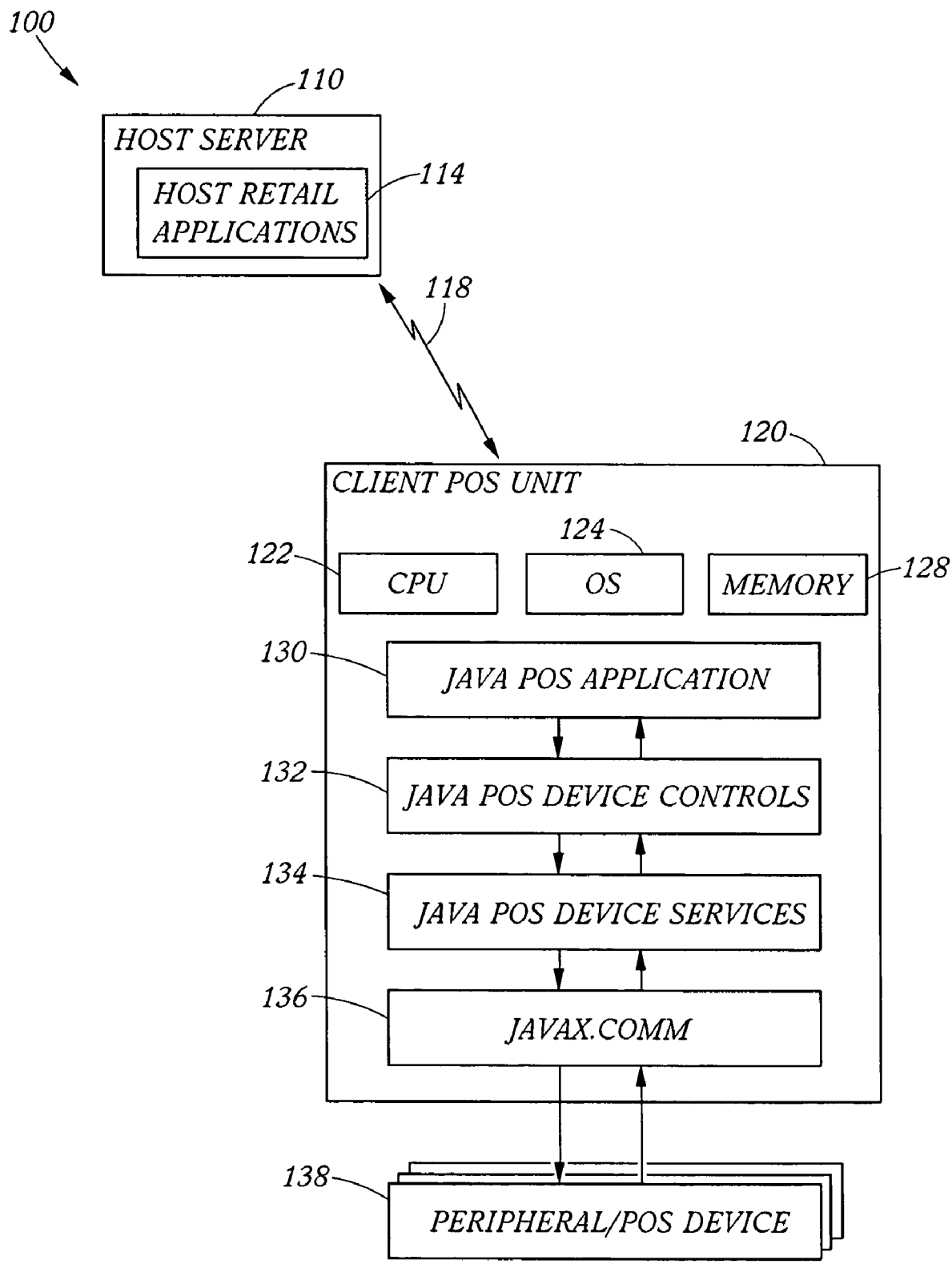
FIG. 1 illustrates a prior POS system in which the POS stack is provided on a POS terminal or unit.

The present invention is directed to methods and systems for providing applications such as POS applications and drivers for peripherals on networked units or terminals, such as POS terminals or the like, from a remote server. In this manner, the networked device network or system is adapted to enable the networked or remote mobile and/or handheld POS to be accessed and controlled by compatible and typically identical applications throughout a network and that match those run on corresponding desk or countertop units, e.g., a networked POS terminal has POS devices accessed and controlled by the same POS application that is run at a checkout counter such as via a JavaPOS or OPOS compliant framework. According to the methods and systems, the networked client or POS is "thin" as it runs only an operating system and a device communications management module that functions to process reads from and writes to the networked client's peripheral ports from a host server. The host server in turn provides the client applications such as POS applications and drivers for the peripherals or POS units (as well as modules for controlling communications between the POS application and drivers and the peripherals or POS units). As a result, in the POS setting, the POS or networked client terminal is relatively "thin" as it does not run the POS application or the peripheral drivers and its peripherals or POS devices do not have to be accessed via a browser or require alteration of the POS application(s), which can installed and maintained in the central or host server and then, provided in a consistent manner to numerous networked POS clients.

The methods and systems can be thought of as a remote device compatibility package that is a software-based system that enables a central server, such as a Sun Ray Server available from Sun Microsystems, Inc., to use a remote, connected client such as a POS unit or terminal as if it were a connected thin client, e.g., similar to a Sun Ray terminal. In the following discussion, the term "POS" will typically be used to refer to a networked electronic device, unit, or terminal that is used to house and otherwise support a number of attached or connected peripherals or devices such as scanners, card swipes, touch screens, and the like, which will be referred to as POS devices or retail devices. The remote compatibility package generally includes server side elements necessary to determine a set of POS that it serves and that are configured for or are capable of being addressed as a thin network client (e.g., similar to a Sun Ray terminal), e.g., a configuration file may be used to define the POS served by a host and for each POS a number of I/O ports will be described including providing an identification of POS devices attached to each I/O port. The server side elements make the thin network clients or POS known to the thin client server module (e.g., a Sun Ray server module or similar thin client server application(s)). The client side elements on the POS include a module for emulating a thin client device expected by the thin client server module or a "device communications management module" (e.g., in the Sun Ray setting, an emulator of a Sun Ray terminal or device making the POS behave as a Sun Ray client). Each target client or networked POS and its peripherals or POS devices are mapped by the thin client server module or other configuration mechanisms such that the target networked device and, more specifically, its peripherals or POS devices, can be accessed and controlled as a remote thin client device by the host server.

For example, in the POS setting, the remote device compatibility package enables a remote unit like a hand-held POS terminal to be controlled by server-resident code without that code needing to be customized for the specific POS terminal. In the case of retail, the advantage of such centralized control is that existing POS software becomes compatible with remote POS or POI devices (e.g., kiosks). This allows one version of a POS application code to be used across a variety of POS terminals without regard to the location of the POS or the type of terminal used to implement a POS. The compatibility package (i.e., methods and systems of implementations of the invention) keeps the remote footprint relatively small and leverages UnifiedPOS mapping platforms or layers such as the JavaPOS and OPOS device layers, which are widely supported. Further, in some embodiments, the Sun Ray protocol for communicating between a host and a client is utilized to facilitate communications between the client POS or POS terminals and the host server, and this enhances ready implementation as this communication protocol is an established technology that will not require unique markup or other communication links for the remote device compatibility package.

To practice the invention, the computer and networked devices, such as those used as networked, remote client devices and host servers, may be any devices useful for providing the described functions, including well-known data processing and storage and communication devices and systems such as computer devices typically known as POS terminals or units with processing, memory, and input/output such as I/O ports, and server devices configured to maintain and then transmit digital data over a wired or wireless communications network. Data typically is communicated in digital format following standard communication and transfer protocols. The POS applications and device drivers or services are preferably written to be compliant with the UnifiedPOS such as by complying with OPOS or JavaPOS. The invention generally takes advantage of thin client technology, such as, but not limited to, the Sun Ray technology, and in Sun Ray-based implementations, the host server may be a specially-configured Sun Ray server and the POS or other networked terminals may be configured in part as a Sun Ray or other thin client terminal, e.g., with a device communications management module which emulates the Sun Ray client. In this manner, every POS application that is written for local peripherals or POS devices will work (e.g., be compatible) as the thin client technology functions to hide the fact that the peripheral is remote.

Figure 2:
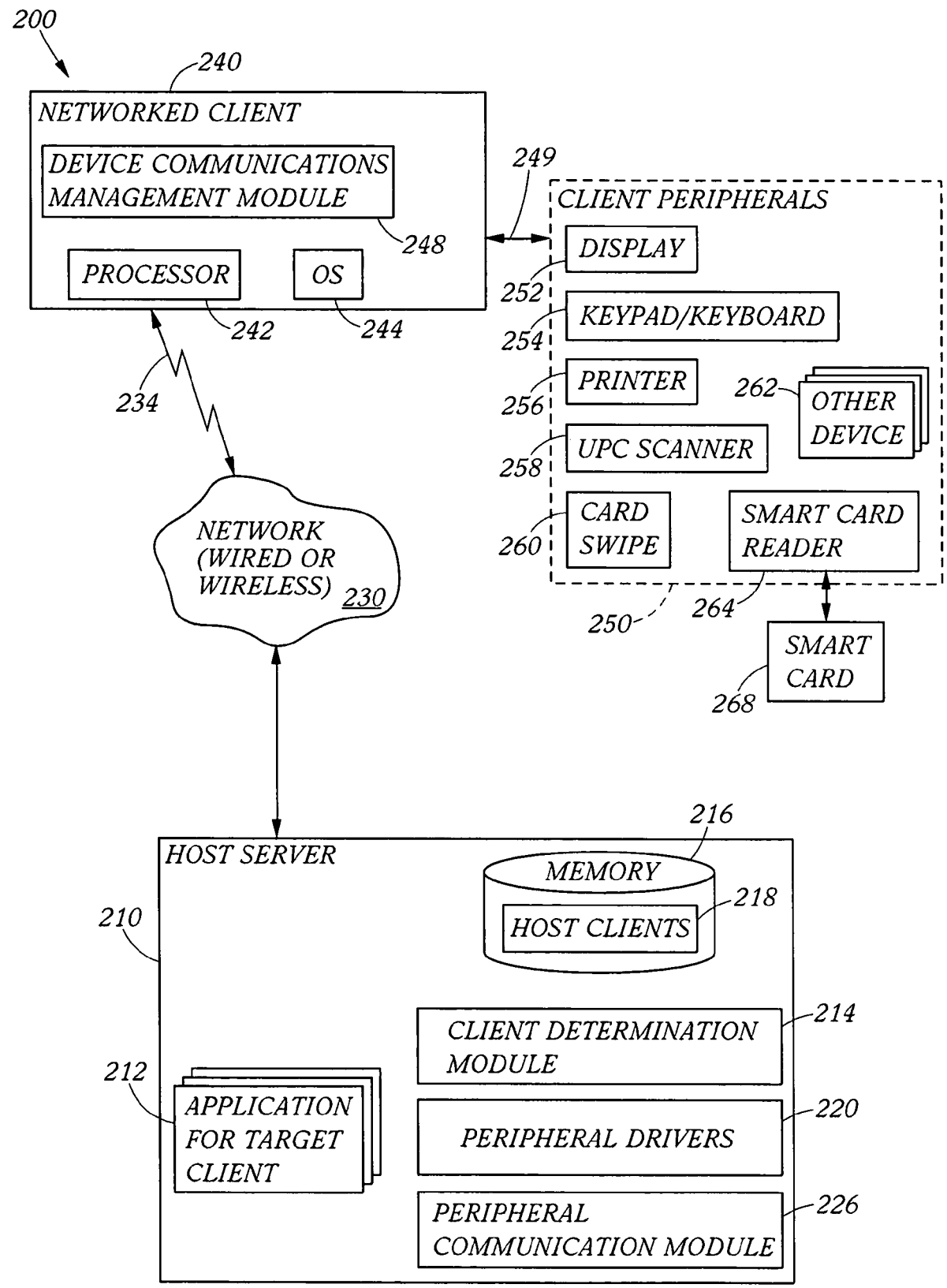
FIG. 2 illustrates an embodiment of a remote or mobile device system of the present invention.

FIG. 2 illustrates a relatively simple networked client system 200 of the present invention. As shown, the system 200 includes a host server 210 that runs or provides one or more applications for target client devices. The host server 210 as discussed above is preferably configured to be a thin client device server, and, for example, may be implemented as a Sun Ray server or similar device to support and communicate with remote, thin clients. The application 212 is installed on the host server 210 and is served to each of a number of clients 240, e.g., number of POS, to allow the POS 240 to remain "thin" and the application may be a POS application or other application.

The host server 210 further includes a client determination module 214 that functions to discover or identify all POS 240 that are linked to the network 230 that are capable of being controlled as a remote, thin client by the host server 210. This may be achieved by retrieving and processing a configuration file or files 218 stored in memory 216 or otherwise accessible that identifies each POS 240 and its I/O ports 249 including the peripherals or POS devices 250 attached or provided at each I/O port 249. Each of these clients or POS is linked with an address and stored as host or target clients/POS 218 in memory 216. As shown, the system 200 includes at least one networked or portable client POS 240 that is connected to an IP network 230 and the host server 210. The client POS 240 includes a device communications management module 248 that functions to manage communications to and from the local devices as needed by the host server 210. For example, the device communications management module 248 may emulate a Sun Ray client when the host server 210 is embodied as a Sun Ray server.

More generally, the device communications management module 248 functions to receive instructions from the host server 210 and to process these instructions. For example, the host server 210 may transmit a write instruction or provide display information to the client POS 240, and the device communications management module 248 acts to process such instructions/data and to provide the instruction/data to the correct port and connected peripherals 250, which may be connected to serial, USB, or other ports (or connection) 249 of the client POS 240 and may be external devices or included within housing of POS 240. The client 240 is "thin" in that it only runs the device communications management module 248 and includes a processor 242 and an OS 244 rather than additional elements that are provided on the host server 210 (such as the application 212 and drivers 220).

The client peripherals or POS devices 250 may include any device operated by the client or POS 240 such as a display 252, a keypad/keyboard 254, a printer (such as a receipt printer) 256, a bar or UPC scanner 258, a magnetic bar or card swipe 260, a smart card reader 264, and other devices 262 (such as touch screens or the like). A user of the POS 240 may begin use of a client by logging in or may use the smart card 268 that carries the user's identification information to initiate a new session or more commonly, to restart a session stored by the host server 210. In retail and other implementations, the smart card 268 may be used to store user or customer information and when read by reader 264 the application 212 may use the data or bring up a particular, saved session. For example, a customer may enter information on a smart card 268 at a kiosk and then provide the smart card to an operator of the client POS 240 who can read the card 268 with reader 264 to bring up a particular session via host server 210 or to use the stored data in application 212.

Significantly, the host server 210 further includes one or more peripheral drivers 220 that are used to drive or control the peripherals or POS devices 250 via communications between the host server 210 and the device communications management module 248. Further, a peripheral communication module 226 (or POS device communication module) is provided to enable the host server 210 to communicate with the client peripherals 250 such as via a simple on-the-wire protocol.

In one embodiment, the system 200 is implemented to be compliant with the UnifiedPOS such as via compliance with JavaPOS. In this case, the application 212 is a JavaPOS application and the peripheral drivers 220 are written to be JavaPOS compliant (e.g., JavaPOS-compliant devices services specific to each POS device 250). The application 212 and drivers 220 are installed (or loaded at runtime as each device 250 is accessed) on the host server 210 and can be updated or changed in a single location and then used to control POS devices 250 connected to POS 240 over the IP network 230, with communications provided in part by communication module 226, e.g., javax.comm or the like. Hence, the device driver 220 does not sit in or reside at the POS 240 as is presently the case in networked systems. The application 212 runs on the server 210 and addresses the POS devices 250 such as the display 252 and the keyboard 254 on the client 240 using local JavaPOS rules/protocols, e.g., as if the retail or POS devices 250 were local to the server 210.

The POS 240 is configured as a thin client of the host server 210, e.g., is configured as a Sun Ray client when the host server 210 is a Sun Ray server. The POS 240 runs the device communications management module 248 that translates host server commands (e.g., commands driven from application 212) to the POS devices 250 such as display 252, keypad/keyboard 254, and other locally-connected peripherals (note, the "peripherals" are sometimes also labeled POS devices and are meant to include all input/output devices connected to or provided as an integral part of a networked device such as a POS). For example, the device communications management module 248 may function to emulate a Sun Ray client, e.g., to process writes to POS devices 250 and to read from POS devices 250 via serial or other connections 249 (provide I/O from ports 249 such as instructions to read or write to a particular port from the host server 210). The client 240 may include a Sun Ray chip (e.g., a Sun Microsystems, Inc. UltraSparcIIEP chip or similar chip/hardware and software) to provide the processor 242 and OS 244, which may be an operating system such as Linux V2.4 or other version, Windows CE or other version of Windows, or other operating system, and to run device communications management module 248. In this manner, the system 200 provides transparent access to the remote client 240 for all JavaPOS-compliant applications 212 (e.g., retail applications and the like used to enable networked POS checkout and other POS solutions).

Figure 3:
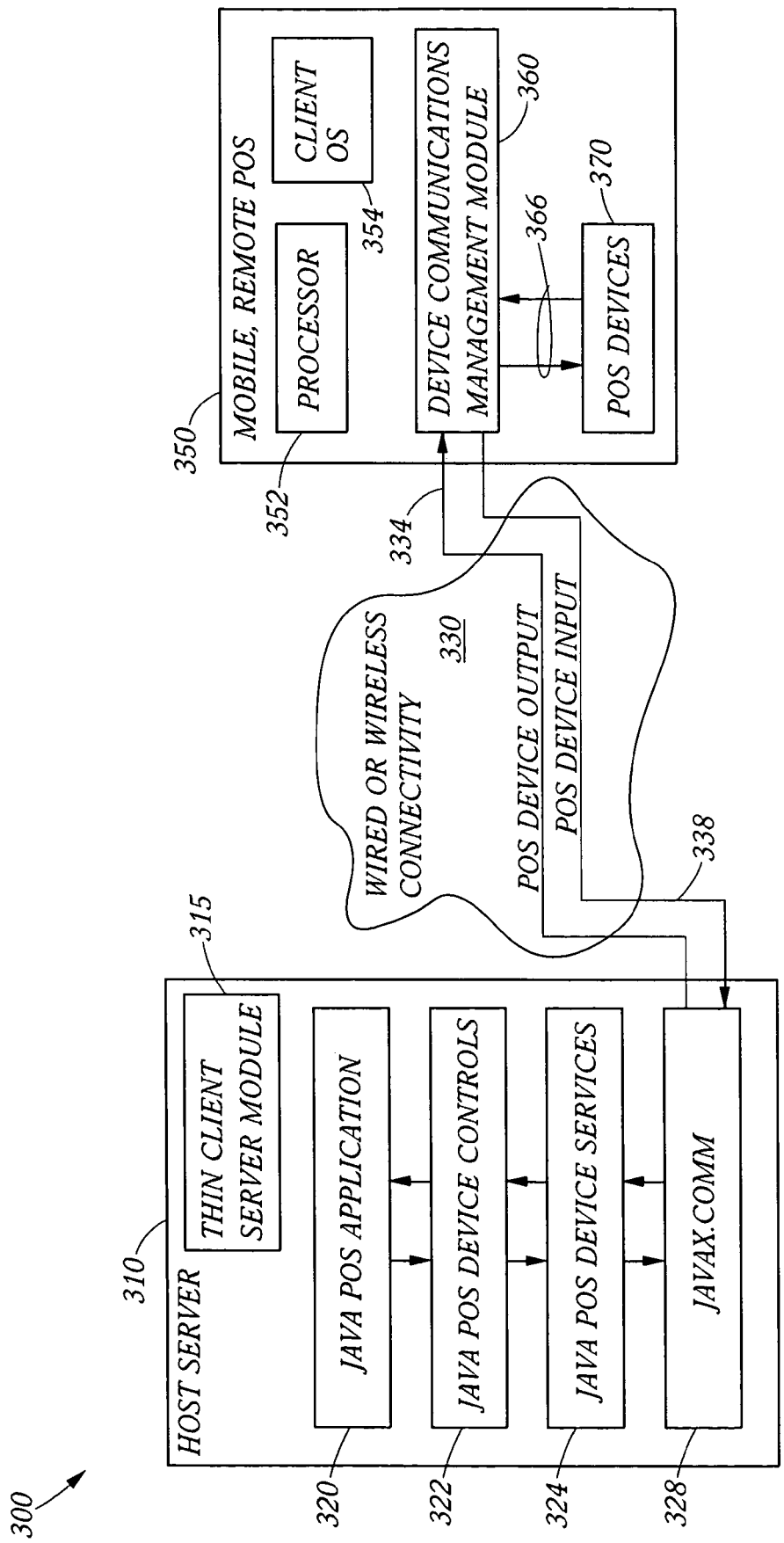
FIG. 3 is a remote or mobile device system of the invention for implementing a UnifiedPOS-compliant system with thin clients using, for example, JavaPOS applications and thin client POS terminals.

While the invention may be implemented in a number of manners, the invention is particularly useful with POS (or POI) devices such as those used in the retail industry and other industries where handhelds or networked devices are used to service customers or clients. More particularly, the invention is particularly well-suited where the applications and drivers are written to comply with UnifiedPOS. With this in mind, the system 300 of FIG. 3 illustrates an implementation that is compliant with JavaPOS. As such a host server 310 is provided that includes a thin client server module 315 that functions to provide the thin client server functionality for controlling or managing a plurality of thin clients with a central or host server 310. For example, the thin client server module 315 may include the Sun Ray server software (such as the Sun Ray Server Software 3.1 or later versions), which allows communications with the networked, remote POS 350 to be handled according to standard host-client protocols used in Sun Ray systems.

As shown a significant portion of the "POS stack" is provided on the host server 310 rather than on the POS 350. Specifically, the host server 310 includes the JavaPOS application(s) 320 such as may be used to provide customer service functionality at a point-of-service. The server 310 further includes JavaPOS device controls 322 and JavaPOS device services 324, which allow the host server 210 to drive the POS devices 370 on or ported to the thin POS 350 and in some embodiments, are loaded with a Java Configuration Loader (JCL) for loading the controls and/or services 322, 324 at runtime based on a configuration file identifying I/O ports for each POS device 370 of a POS 350 managed by server 310. The host server 310 further includes the Javax.comm module 328, which allows the drivers (or services and controls) 322, 324 to communicate with the devices 370 (or the ports on the POS client 350), e.g., write and read data to a remote port on POS 350.

The system 300 includes one (and, more typically, numerous) mobile or remote networked POS client 350. The POS 350 is in communication with the host server 310 via the Javax.comm module 328 and network connectivity 330. Preferably, communications 334, 338 are performed using a known or tested communication protocol, and in one embodiment, the communications 334, 338 are performed using the host-client communication protocol implemented in Sun Ray systems between the host server and the thin clients (although this is not intended to be a limiting requirement of the invention). POS device outputs (such as data for a display, data to be printed in a customer receipt, and/or data from JavaPOS application 320) 334 that are often in the form of writes to ports associated with POS devices 370 are transmitted to the POS 350 from the Javax.comm module 328 where they are translated by the device communications management module 360 and passed to the correct port 366 and POS device 370. POS device inputs 338 that are often in the form of reads from the POS devices 370 or device ports 366 are transmitted from the device communications management module 360 to the host server 310 (or the JavaPOS application 320) via the Javax.comm module 328.

As shown, the remote POS 350 includes a processor 352 that runs an instance of client operating system (OS) 354 (such as a Linux or a Windows OS). The POS or networked client 350 is thin relative to prior POS units or terminals as it does not run the JavaPOS application 320 or the peripheral or POS device drivers 322, 324, which instead are provided on host server 310. Instead, the POS 350 only runs the device communications management module 360, which functions to know how to interpret writes from the host server 310 (from application 320) and reads from the POS devices 370 via ports 366. The device communications management module 360 can be thought of as emulating or providing a thin client application that corresponds with or is compatible with the thin client server module 315 so as to support communications 334, 338 and allow control of the POS 350 and its devices 370 with the server 310 as if the POS devices 370 were local. In other words, the POS 350 is configured by the inclusion of the device communications management module 360 to support the client side of the thin client protocol implemented by thin client server module 315 (e.g., Sun Ray Server Software or the like), and as a result, any given POS 350 such as a mobile unit or terminal, a checkout lane device, a legacy device such as an x486, or the like can be accessed and managed by JavaPOS-compliant applications 320 and device drivers 322, 324 with transparent access and control capabilities of remote POS peripherals 370 without the POS application 320 or drivers 322, 324 being resident on the POS 350.

It may be useful to provide additional descriptions of some of the components of the system 300 used to provide the remote device compatibility. The javax.comm 328 is typically implemented as an instance of the Java Communications 3.0 or later version API, which is an extension that facilitates developing platform-independent communications applications for POS devices or peripherals such as smart cards, embedded systems, faxes, modems, display terminals. The javax.comm 328 preferably provides applications such as application 320 with access to serial ports (e.g., RS-232 hardware) and other ports such as parallel ports. For example, the javax.comm 328 may work with the thin client server module 315 (e.g., Sun Ray server software) and includes port mapping extensions and may include API serial features such as enumeration of ports or port mapping, port configuration, receive-buffer threshold control, hardware and software flow-control options, and significantly, transfer of data over ports (such as RS-232 ports).

The JavaPOS application 320 interfaces, e.g., a JavaPOS API, with the JavaPOS device control 322 which interfaces, e.g., the JavaPOS device/service interface, with the JavaPOS device service 324. The JavaPOS application 320 is typically either a Java application or applet that uses one or more POS devices 370. An application 320 accesses the POS devices 370 through the JavaPOS device controls 322 and JavaPOS device services 324 (and the interfaces they provide and as are typically defined by Java interfaces), which may be thought of as providing a JavaPOS device in combination. The JavaPOS device control 322 provides the interface between the application 320 and the device category, and it is designed so that all implementations of a device category's control are compatible. The JavaPOS device service 324 is a Java class that is called by the device control 322 to implement functionality prescribed by the JavaPOS application 320 for a physical device 370. It can also call special event methods provided by the device control 322 to deliver events to the application 320. A set of device services 243 can be implemented to support physical devices 370 with multiple device categories (such as cash drawer, POS printer, bar code scanners, and the like). The JavaPOS configuration/loader (JCL) (not shown) may be used to provide a binding (e.g., configuration and loading) API that enables a JavaPOS control 322 to bind to the correct JavaPOS service 324.

With the above description of embodiments of the invention in mind, it may now be useful to provide a brief review of how some of the features described can be implemented and how these features provide useful improvements.

UnifiedPOS: Presently, UnifiedPOS is a retail industry standard that defines a series of POS device types (scanners, mag stripe readers, printers, keyboards, signature capture, cash drawers, etc.) in terms of a unique collection of properties, methods and events. The purpose is to allow POS application writers to become independent of the actual vendor and model of the peripherals they communicate with. This is achieved by having each conformant device vendor write a "Device Service" that supports the UnifiedPOS set of properties, methods and events, to make the device specifics (e.g., escape sequences) invisible to the calling application. So, the application uses the UnifiedPOS interface and the Device Service translates it directly into the escape sequences needed by the device, and issues (or receives) them from the local IO port which is connected to the actual POS device.

JavaPOS: From above, UnifiedPOS defines a series of POS device models and uses UML (Universal Modeling Language) to do so. As a result, it cannot be directly implemented, but it must instead be mapped to a specific platform before developers can implement UnifiedPOS compliant solutions. For the Java platform, that mapping is called JavaPOS. All device properties, methods and events are specified in the Java language so that Java applications and Device Services can invoke or support them. JavaPOS is a widely deployed standard within the retail industry.

However, Java is more than a language. It is a complete platform, and Java programs are shielded from the underlying hardware and operating systems they may be deployed on, e.g., write it once and run it everywhere. This causes problems for the JavaPOS compliant Device Service, because the way in which devices are accessed (the selection of which local I/O port the device is attached to, and the mechanism for issuing read/write commands to that port) is operating system dependent. A problem concerns how a JavaPOS Device Service can be configured or designed to be independent of the underlying OS.

Javax.comm: To address the preceding problem or issue, the JavaPOS standard relies on another programming standard called Javax.comm. This is a module which converts Java I/O Port read and write requests into the required set of operating system dependent commands that issue and accept the actual I/O data to and from the appropriate local I/O port. Javax.comm basically encapsulates the differences between operating system environments and presents the same standardized interface to the JavaPOS Device Service no matter what OS is running underneath. This enables both JavaPOS applications and JavaPOS Device Services to run transparently over any operating system for which the Javax.comm module is supported, with the OS list including Windows, Solaris and Linux. However, before the present invention, this OS transparency was for access to locally connected devices only.

Sun Ray Technology: As discussed above, Sun Ray technology carries the thin desktop client to new extremes. The Sun Ray server communicates with the remote Sun Ray client using an on-the-wire protocol that basically says "write these bytes on this 10 port, read some bytes from that 10 port." As a result, the Sun Ray client needs only the collection of devices a user would interface with, such as screen, keyboard, mouse, and smart card reader, and some "bare metal" software that supports that protocol. No disks, operating system or device drivers are required. All device drivers and applications reside remotely, on the Sun Ray server.

Sun Ray POS (an exemplary embodiment of the invention including the device communications management module or Sun Ray client emulator application): One aspect of the invention is to combine the two technologies to allow JavaPOS Device Services (and by extension, JavaPOS applications) to transparently access and control remote POS peripherals. This is done by providing a Javax.comm interface on the Sun Ray server, which communicates with devices located remotely on the Sun Ray client, using the identical on-the-wire Sun Ray protocol. One immediate advantage of this approach is that the collection of devices on the client can be extended to include the full set of JavaPOS retail devices since all client/server communication is limited to byte stream and I/O port. All of the knowledge of what the device is and what data it needs to operate or return are kept at the Device Service level, which is now located on the Sun Ray server (or host server in the attached figures).

In other words, the JavaPOS Device Service requests for local I/O port read/write operations are transparently conveyed to remote Sun Ray client retail devices as similar requests are conveyed to standard Sun Ray client devices today. Some of the differences include that there are retail POS-specific devices connected to the Sun Ray client and there are JavaPOS applications and Device Services deployed on the Sun Ray or host server.

Transparent access to remote POS devices becomes a reality because all layers above the Sun Ray implementation of Javax.comm think the devices are local. As a result, the same POS application and set of JavaPOS Device Services can support checkout lane terminals, kiosks and handheld mobile units (whether customer or sales-assisted checkout). This represents a major value-add for the retailer in terms of support, deployment, risk, and integration. Sun Ray POS extends the JavaPOS promise to write it once and deploy it at every customer touch point.

Additional Sun Ray POS Extensions (i.e., Additional Aspects of the Invention): Prior to this invention, the Sun Ray client was implemented in hardware, e.g., on a chip. Part of this invention involves creating a device communications management module which is a Sun Ray client software emulator (Sun Ray Soft) which will transparently support the on-the-wire protocol, but do so completely with software. Two advantages accrue.

First, any handheld unit, no matter how small the footprint, can be converted into a Sun Ray client, and a remote JavaPOS application can now remotely control all its POS peripherals (allowing customer checkout to occur) as if the devices were local.

Second, any existing legacy POS terminal running outdated POS applications can be converted into a Sun Ray client by installing Sun Ray Soft. This allows a retailer to run the latest and more feature-full JavaPOS-compliant retail applications without also incurring a huge hardware terminal replacement cost.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the examples here have stressed the use of JavaPOS complaint POS applications, drivers, and other components but the broad ideas of invention cover any POS implementation such as those compliant with OPOS or other UnifiedPOS-complaint architectures such as the planned ".Net/C#" architecture and those not yet identified or developed.

We claim:

1. A networked device system for providing compatible point-of-service (POS) applications on remote client devices, comprising:

a host server comprising a POS application and a set of device drivers;

a communication network for transferring digital data; and a networked client communicating with the host server via the communication network, wherein the networked client device comprises a plurality of connected devices and a device communications management module that processes output received at the networked client from the POS application to determine a target one of the connected devices and that transfers POS device input received from one or more of the connected devices over the communication network to the POS application, wherein the POS application interfaces with the set of device drivers and wherein the output received at the networked client is provided by one of the device drivers corresponding to the target one of the connected devices.

2. The system of claim 1, wherein the connected devices are connected to ports of the networked client and wherein the host server further comprises means for mapping each of the devices to one of the ports and means for supporting communication of the output to one of the ports mapped to the target one of the connected devices.

3. The system of claim 1, wherein the POS application and the device drivers comply with the UnifiedPOS standard or some other standardized device abstraction interface.

4. The system of claim 1, wherein the host server further comprises a thin client server module and wherein the device communications management module of the networked client is configured to emulate a thin client for the thin client server module, the thin client server module managing the networked client as a thin client.

5. The system of claim 4, wherein the POS device input and the output is communicated over the communication network based on a thin client communication protocol implemented by the thin client server module and the device communications management module.

6. The system of claim 4, wherein the thin client server module comprises Sun Ray Server Software and the device communications management module comprises means for configuring the networked client as a Sun Ray terminal.

7. The system of claim 4, wherein the thin client server module stores a session for a user of the networked client and wherein the session is restored by logging in by the user via an input device or by reading of a smart card by one of the devices of the networked client.

8. A method for providing point-of-service (POS) applications on networked POS units, comprising:

providing a server that is linked to a digital communications network;

operating the server to determine a set of client POS units and the set of peripherals associated with each of the client POS units;

on the server, running an instance of a POS application corresponding to each of the client POS units; and calling a device control on the server with one of the POS applications to drive an output of the one POS application to one of the peripherals on the corresponding client POS unit, wherein each device in the set of peripherals for each of the client POS units is mapped to a particular port, and wherein the method further includes operating a peripheral communication module on the host server to communicate the output of the one POS application to the one of the peripheral devices on the client POS unit.

9. The method of claim 8, further comprising calling an additional device control on the server with the one POS application to drive an additional output of the one POS application to another one of the peripherals of the one client POS unit.

10. The method of claim 8, wherein the POS applications and the device control comply with the UnifiedPOS standard, or some equivalent standardized device abstraction interface.

11. The method of claim 8, further comprising running an device communications management module on the client POS units, the device communications management module configured to process output from the POS application and direct the processed output to the specific peripherals associated with the output.

12. The method of claim 11, further comprising operating the device communications management module on one of the client POS units to read input from one of the peripherals of the one client POS unit and to transmit the read input over the communication network to the host server for processing by the associated instance of the POS application.

13. The method of claim 8, further comprising configuring the server as a thin client server and managing the determined set of client POS units as thin clients with the thin client server.

14. A networked device system, comprising: a sewer comprising a software application and set of drivers; and a networked client communicating with the server via a communication network, wherein the networked client comprises connected devices and a device communications management module processing received output from the server to determine a target one of the connected devices and reading and transferring input from one of the connected devices over the communication network to the server for processing by the software application, wherein the software application is a UnifiedPOS-compliant (or an equivalent standardized device abstraction interface compliant) application operating on the server to interface with the set of drivers and wherein the output received at the networked client is provided by one of the drivers adapted for controlling the target one of the connected devices, wherein the connected devices are peripherals connected to ports of the networked client and wherein the server further comprises means for mapping each of the connected devices to one of the ports and means for supporting communication of the output to one of the ports mapped to the target one of the connected devices.

15. The system of claim 14, wherein the server further comprises a thin client server and wherein the device communications management module of the networked client configures the networked client as a thin client of the thin client server module.

16. The system of claim 14, wherein the device input and the output are communicated over the communication network based on a thin client communication protocol implemented by the thin client server and the device communications management module of the networked client.

* * * * *